United States Patent [19]

Weling

[11] Patent Number: 5,757,502
[45] Date of Patent: May 26, 1998

[54] METHOD AND A SYSTEM FOR FILM THICKNESS SAMPLE ASSISTED SURFACE PROFILOMETRY

[75] Inventor: Milind Weling, San Jose, Calif.

[73] Assignee: VLSI Technology, Inc., San Jose, Calif.

[21] Appl. No.: 723,617

[22] Filed: Oct. 2, 1996

[51] Int. Cl.$^6$ .................................................. G01B 11/06
[52] U.S. Cl. ............................ 356/376; 356/381; 356/73
[58] Field of Search ............................... 356/376, 375, 356/381–382, 72–73, 345, 359, 361

[56] References Cited

U.S. PATENT DOCUMENTS

| | | | |
|---|---|---|---|
| 4,900,940 | 2/1990 | Nakamura | 356/376 |
| 5,351,126 | 9/1994 | Takada et al. | 356/381 |
| 5,398,113 | 3/1995 | de Groot | 356/376 |

*Primary Examiner*—Hoa Q. Pham
*Attorney, Agent, or Firm*—Wagner, Murabito & Hao

[57] ABSTRACT

A system for film thickness sample assisted surface profilometry. The sample assisted surface profilometry system of the present invention is utilized to determine an absolute topography variation of a surface of a layer of an integrated circuit with respect to the surface of an underlying layer of known height orientation. The present invention is comprised of a thickness measurement tool for measuring a thickness of the layer at sample points. The thickness measurement tool measures a thickness sample, wherein the thickness sample characterizes the thickness of the layer over the known layer. A surface profilometry tool is coupled to the thickness measurement tool to receive the thickness measurements of the sample points. The surface profilometry tool is utilized to measure relative topography variations of the surface of the layer. The surface profilometry tool then determines absolute height variations of the surface of the layer based on the absolute height reference plane and relative height variations. This information is used to determine a maximum absolute height variation of the topography of the surface of the layer.

16 Claims, 13 Drawing Sheets

400

5,757,502

1

METHOD AND A SYSTEM FOR FILM THICKNESS SAMPLE ASSISTED SURFACE PROFILOMETRY

FIELD OF THE INVENTION

The field of the present invention pertains to surface profilometry. More particularly, the present invention relates to a surface profilometry device for characterizing a surface of a semiconductor die.

BACKGROUND OF THE INVENTION

In the photolithography process, a mask, or pattern, defining the various components, is imaged onto a photosensitive layer on the surface of a die using ultraviolet light. The image is focused onto the surface using a photolithography tool, and is imprinted into the photosensitive layer. To build smaller features, increasingly fine images need to be focused onto the surface of the photosensitive layer, e.g., optical resolution needs to be increased. As optical resolution increases, the depth of focus of a mask image correspondingly narrows. This is due to the narrow range in depth of focus imposed by the high numerical aperture lenses in a photolithography tool. This narrowing depth of focus is often the limiting factor in the degree of resolution obtainable using the photolithography tool. The extreme topography of complex integrated circuits (ICs), the "hills" and "valleys," exaggerate the effects of decreasing depth of focus. Thus, in order to adequately focus the mask image defining sub-micron geometries onto the photosensitive layer, a precisely flat surface is desired. The precisely flat (e.g., fully planarized) surface allows for relatively small depths of focus, and in turn, allows the definition and subsequent fabrication of sub-micron components.

FIG. 1A shows a cross section of a die 10 before planarization. The die 10 includes a silicon substrate 11, with components fabricated on top of the substrate and creating a topography 12. The topography 12 is covered by a layer 13 of oxide material. The height difference between the surface of the layer 13 at a "high" point 14 and the surface of the layer 13 at a "low" point 15 represents the topography variation of the die 10. As described above, at sub-micron resolutions, the depth of focus of the photolithography tool is extremely narrow. The topography variation of the die 10 limits the resolution obtainable because the difference between the height of high point 14 and the height of low point 15 exceeds the depth of focus of the photolithography tool. In essence, a photolithography tool (not shown) mounted above the die 10 is unable to simultaneously focus a mask image on the surface of high point 14 and low point 15.

FIG. 1B shows the cross section of the die 10 after planarization using a CMP (chemical mechanical polishing) process. The topography 12 is covered by a thick layer 13 of dielectric material. The layer 13 has been polished such that the height difference between the surface of the layer 13 at a high point 14 and the surface of the layer 13 at the low point 15 is relatively small. Thus, the above positioned photolithography tool (not shown) can focus the mask image on all points of the surface of the layer 13 simultaneously, since the topography variation of the die 10 is within the depth of focus. In deep sub-micron processes the greatest planarity variation tolerable is often 0.3 microns or less. Because of these tolerances, the wafer planarity produced by planarization techniques should be very closely monitored.

There are several techniques known in the prior art for measuring planarity. One technique is atomic force microscopy (AFM). AFM tools (often referred to as profilometry tools) operate by scanning a fine stylus across a surface and measuring the voltage required to keep the tip at a fixed height above the surface. Another such technique includes the use of scanning electron microscopes (SEMs). Planarity is estimated by scanning a cross section of a fabricated device. With each of these techniques, the objective is to characterize the surface of the die, e.g., to determine the maximum topography variation of the surface of an upper most dielectric layer.

FIG. 2A shows a diagram of a side view of an exemplary die 20 and FIG. 2B shows a top down view of the die 20. Direction 22 represents the trace followed by a profilometer as it scans across the die, where every point on the die has a set of x, y, and z coordinates. For a given y, the profilometer scans from x=0 (the first edge of the die) to x=n (the second edge of the die). The scan records the topography variations, measured in the z direction, and the topography variation of the surface is stored. FIG. 2C shows an enlarged portion 21 of the surface of the die 20. The profilometer will record the maximum topography variation of surface 23, where the maximum topography variation is the z difference between the lowest point of the surface of die 20 and the highest point of the surface of die 20.

FIG. 3A shows an enlarged portion 10 of the surface of a die 31. There is a problem when the orientation of the surface 33 cannot be reliably determined with respect to the orientation of the underlying substrate 32. Here, the surface has a constant height between the surface 33 of the dielectric layer 31 and the underlying substrate 32. The profilometry tool scans across the surface (represented by line 44) and does not detect any variations in surface topography. In FIG. 3B, however, the surface 35 of the dielectric layer 34 varies across the underlying substrate 36. The layer 34 has a greater thickness 37 at one point than an a thickness 38 at opposing point. The profilometry tool, however, does not detect any relative variations in surface topography, in the same manner as in FIG. 3A. The profilometry tool cannot distinguish between the die 30, which has virtually no topography variation with respect to the underlying substrate 32, and the die 39, which has unacceptable topography variation with respect to underlying substrate 36. In both dies 30 and 39, the profilometry tool detects a relatively smooth and unvarying surface and is unable to detect the thickness variation of the layer 34 with respect to the known substrate layer 36. The profilometry tool is not able to adequately account for the thickness variation of the layer 34 due to the fact that it does not have means to accurately determine the location and orientation of the substrate 36. Thus, the surface of die 34 appears smooth and unvarying, as in FIG. 3C, to the profilometry tool. Die 31 of FIG. 3A and die 34 of FIG. 3C appear indistinguishable. This is due to the fact that the profilometry tool measures relative topography variation from an estimated reference substrate plane which is less accurate than measuring topography variation from the plane of the actual substrate.

Thus, what is desired is a system for accurately measuring the absolute topography variation of a surface of a layer with respect to the surface of a known underlying layer. What is further desired is a system for accurately measuring the absolute topography variation of the surface of a dielectric layer with respect to the surface of an underlying semiconductor substrate. The present invention provides such a system.

SUMMARY OF THE INVENTION

The present invention is a system for a film thickness sample assisted surface profilometry. The sample assisted surface profilometry system of the present invention is utilized to determine an absolute topography variation of a surface of a layer with respect to the surface of a known underlying layer. The present invention is comprised of a thickness measurement tool for measuring a thickness of the layer. The thickness measurement tool measures a thickness sample, wherein the thickness sample characterizes the thickness of the layer over the known layer. Given the thickness measurement and the height of the known sample, the present invention determines the absolute height coordinate of the surface of the layer at the sample point. A surface profilometry tool is coupled to the thickness measurement tool to receive the absolute height coordinates of the sample. The surface profilometry tool is utilized to measure relative topography variations of the surface of the layer. The surface profilometry tool uses the absolute height coordinates of the sample to determine an absolute height reference plane, wherein the reference plane is measured with respect to the known layer. Given the determined absolute height reference plane, the measurements taken by the surface profilometry tool are translated into absolute height measurements. These latter measurements are used to calculate a maximum absolute topography variation of the layer.

In one implementation of the sample assisted surface profilometry system of the present invention, the absolute topography variation of the surface of a dielectric layer is accurately measured with respect to the surface of an underlying semiconductor substrate. The thickness measurement tool is an optical thin film measuring device and the result of the measurement of this implementation is a maximum absolute topography variation of the surface of the dielectric layer.

BRIEF DESCRIPTION OF THE DRAWINGS

The present invention is illustrated by way of example and not by way of limitation, in the figures of the accompanying drawings and in which like reference numerals refer to similar elements and in which.

DETAILED DESCRIPTION OF THE INVENTION

Figure 1A:
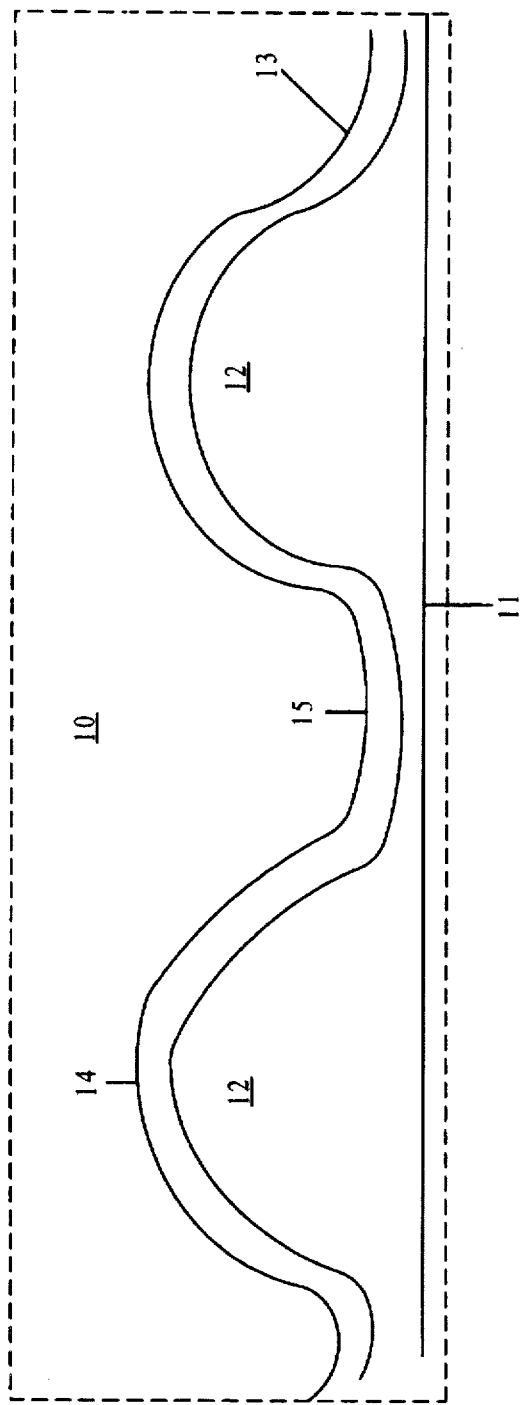
FIG. 1A shows a cross section of a prior art die before planarization.
Figure 1B:
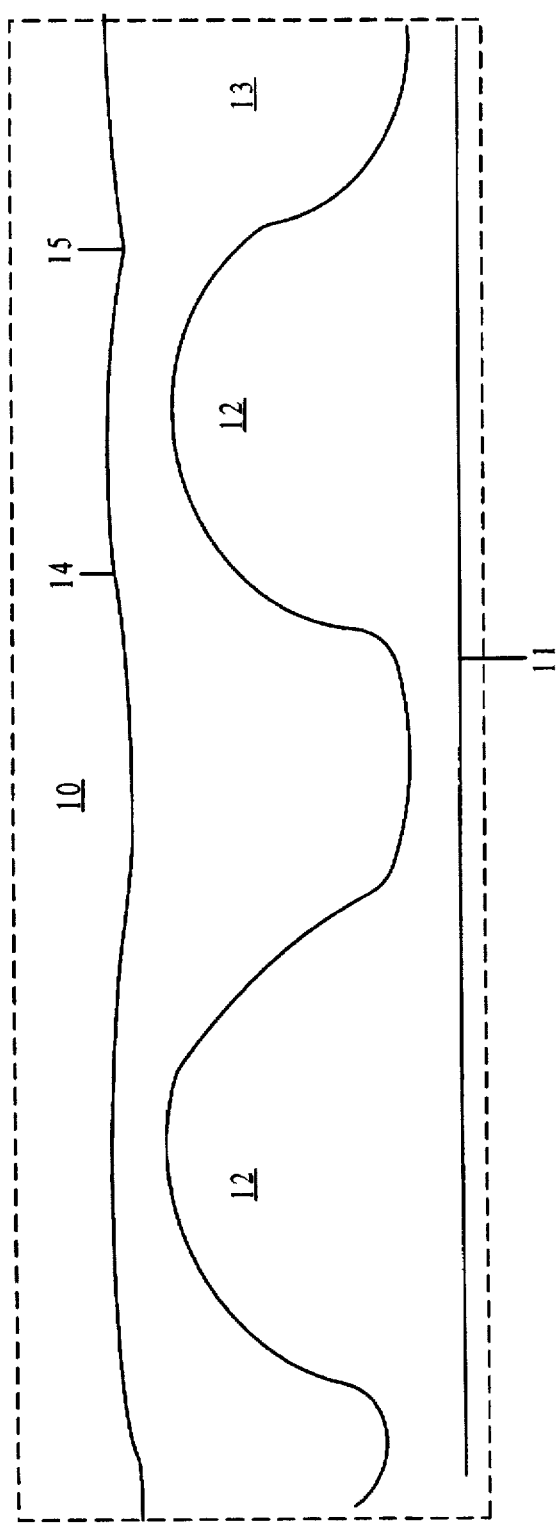
FIG. 1B shows a cross section of the prior art die after planarization.
Figures 2A, 2C:
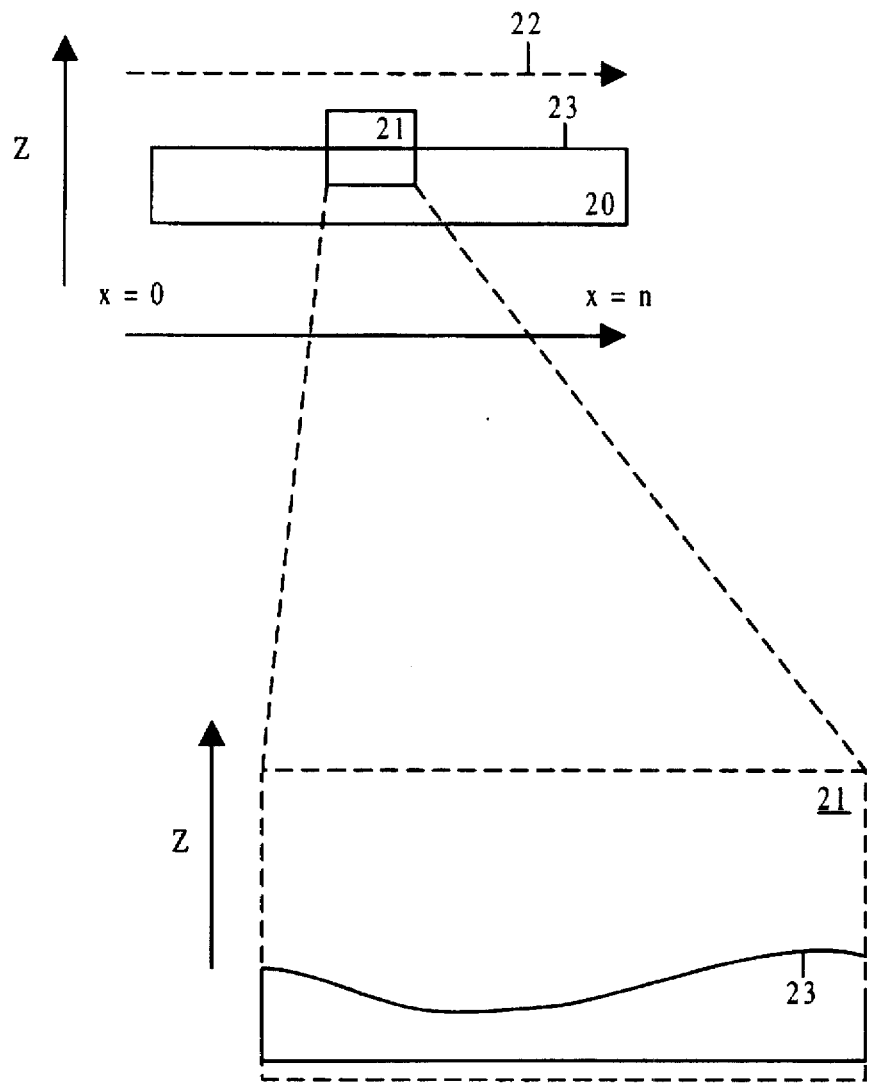
FIG. 2A shows a diagram of a side view of a prior art die.
FIG. 2C shows an enlarged portion of the prior art die of FIG. 2A.
Figure 2B:
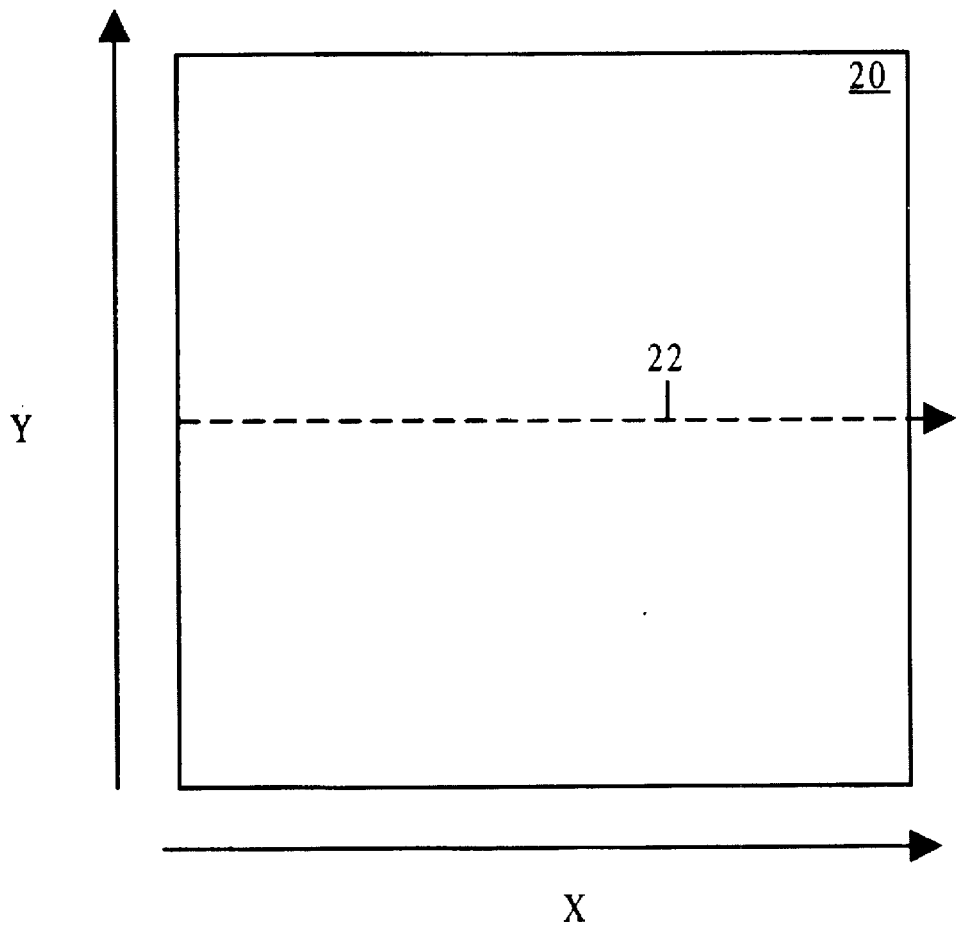
FIG. 2B shows a diagram of a top down view of the prior art die of FIG. 2A.
Figure 3A:
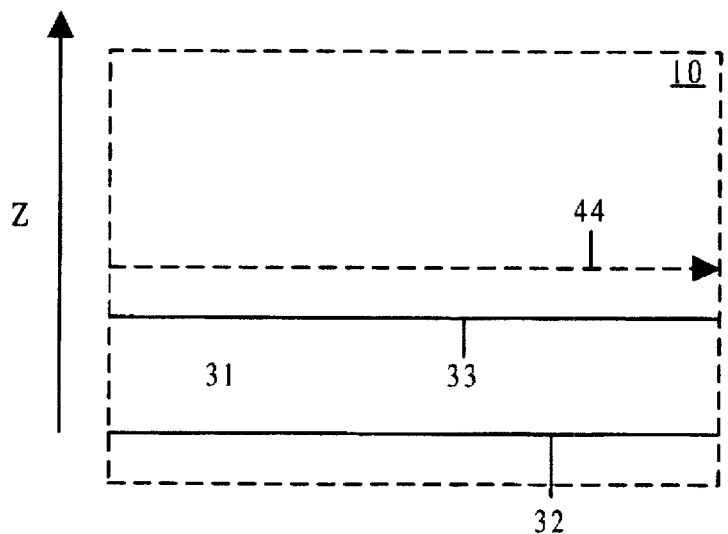
FIG. 3A shows an enlarged portion of the surface of a prior art die having a constant height between an upper surface of a dielectric layer and an underlying substrate.
Figure 3B:
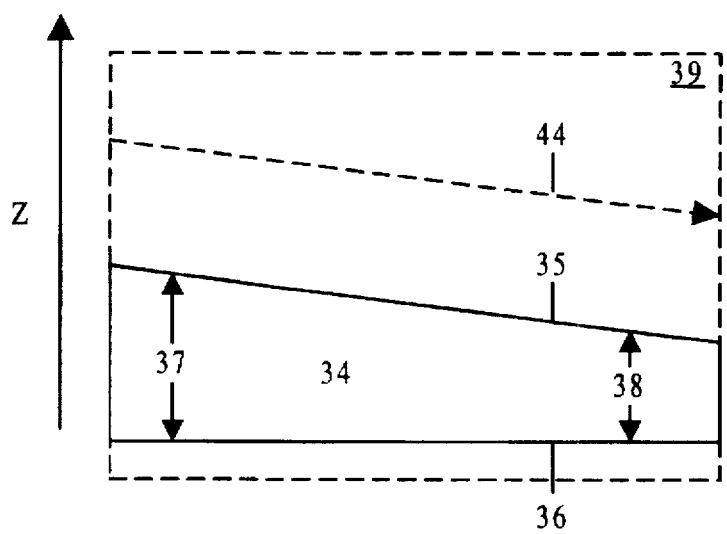
FIG. 3B shows an enlarged portion of the surface of a prior art die having a varying height between an upper surface of a dielectric layer and an underlying substrate.
Figure 3C:
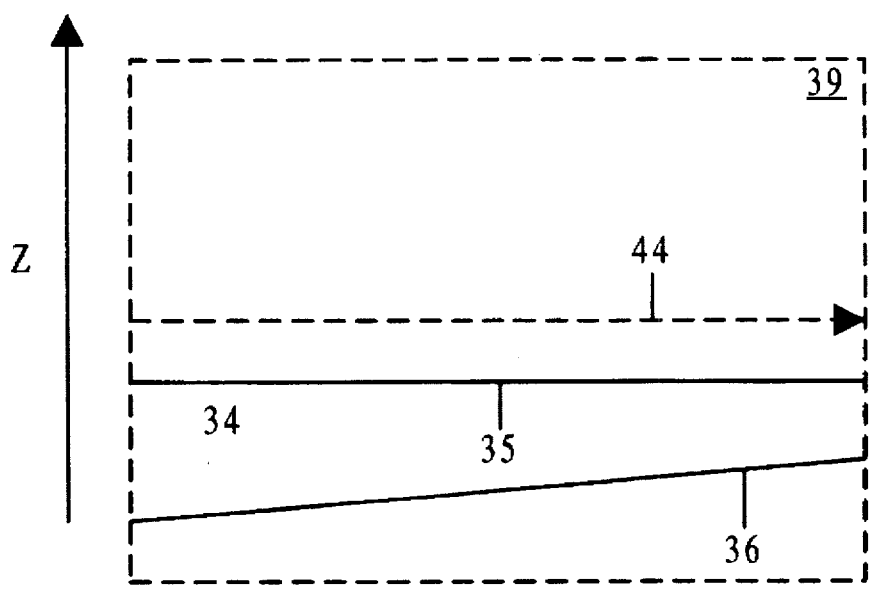
FIG. 3C shows the orientation of the enlarge portion of the surface of the prior art die from FIG. 3B.

A method and system for sample assisted surface profilometry is disclosed. In the following description, for the purposes of explanation, numerous specific details are set forth in order to provide a thorough understanding of the present invention. It will be obvious, however, to one skilled in the art that the present invention may be practiced without these specific details. In other instances, well-known structures, devices, and processes are shown in block diagram form in order to avoid unnecessarily obscuring the present invention.

Much of the speed and usefulness of today's digital integrated circuit (IC) devices can be attributed to the increasing levels of integration. More and more components (resistors, diodes, transistors, and the like) are continually being integrated into the underlying chip, or IC. The starting material for typical ICs is very high purity semiconductor (e.g., silicon). The material is grown as a single crystal and then sawed (like a loaf of bread) to produce wafers, typically 10 to 30 cm in diameter and 250 microns thick. Each wafer, in turn, yields a number of dies and each die is subsequently fabricated into an IC. The geometry of the features of the IC components are commonly defined photographically through a process known as photolithography. The photolithography process is used to define component regions and construct components one layer on top of another. Complex ICs can often have many different built up layers, each layer having components and differing interconnections, and each layer stacked on top of the previous layer. The resulting topography of these complex IC's often resemble familiar terrestrial "mountain ranges", with many "hills" and "valleys" as the IC components are built up on the underlying surface of the silicon wafer.

The extreme topography of complex ICs, the "hills' and "valleys," however, exaggerate the effects of decreasing depth of focus in photolithography tools used in the fabrication process. Thus, in order to properly focus a mask image defining sub-micron geometries onto the surface of a die, a precisely flat surface on the die is desired. The precisely flat (e.g., fully planarized) surface allows for relatively small depths of focus, relatively high resolution, and in turn, allows the definition and subsequent fabrication of sub-micron components.

The present invention operates with several techniques for obtaining full planarization (global planarization) of a wafer. Chemical-mechanical polishing (CMP) can be used which involves removing a sacrificial layer of dielectric material using mechanical contact between the wafer and a moving pad saturated with slurry, thereby polishing out height differences. Another method that can be used is the spin-on-glass (SOG) etch back technique which involves using a thick layer of oxide deposited on the metal lines of an IC, followed by the deposition of a SOG layer to fill the topography between the metal lines. The SOG and the underlying oxide are then anisotropically etched at the same rate across the wafer, thereby planarizing surface of the wafer. In order to maximize yields, the planarization technique needs to perform adequately and consistently to a calibrated level. The present invention is used to measure the quality of planarization resulting from the above techniques.

Manufacturers closely monitor the performance of their wafer planarization processes to ensure these topography tolerances are not exceeded. Representative dies are statistically selected from a fabrication lot and examined. At sub-micron resolutions, the depth of focus of the photolithographic process is very narrow. Because of this, the maximum planarity variation tolerable is often less than 0.3 microns. The sample assisted surface profilometry system of the present invention is utilized to determine an absolute topography variation of the surface of the die.

In one implementation of the sample assisted surface profilometry system of the present invention, the absolute topography variation of the surface of a dielectric layer of a die is accurately measured with respect to the surface of an underlying known semiconductor substrate of the die. The thickness measurement tool of the present invention measures a thickness sample, wherein the thickness sample characterizes the thickness of the dielectric layer over the known underlying semiconductor substrate. The surface profilometry tool of the present invention then uses data from the thickness sample to determine a reference plane, wherein the reference plane has absolute height coordinates. In this manner, the surface profilometry tool measures the surface of the dielectric layer and these measurements can be adjusted with respect to the reference plane and used to determine a maximum absolute topography variation of the dielectric layer in relation to the underlying semiconductor substrate. The sample assisted surface profilometry system of the present invention is described in greater detail in the following sections.

The thickness measurement tool in one implementation of the present invention is an optical thin film measurement tool which accurately measures the thickness (height) of the dielectric layer using optical interferometer techniques. In this tool, a "measurement" beam of light is directed onto the surface of the dielectric layer. A portion of the measurement beam is reflected off of the dielectric layer and a portion of the measurement beam is transmitted through the surface of the layer, through the thin film (e.g., the dielectric material), and onto the surface of the underlying substrate, where it is reflected. The reflected light beam subsequently interferes with the measurement beam, creating an interference pattern. The interference pattern characterizes the thickness of the dielectric layer and is recorded by instruments. It should be appreciated that the thickness measurement tool of the present invention, in addition to the optical interferometry technique, may employ one of several other methods known in the art, such as infrared thin film measurement tools and acoustic measurement techniques. As such, the present invention is suited to utilize other thickness measurement methods or techniques.

The surface profilometry tool of the present implementation is an atomic force microscopy (AFM) tool which accurately measures the relative topography variation of the dielectric layer using AFM techniques. It should be appreciated that the surface profilometry tool may be employ one of several methods known in the prior art. As such, the present invention can be adapted to employ other thickness measurement methods or techniques. AFM surface profilometry tool of the present implementation makes relative topography height measurements with angstrom level precision. The AFM surface profilometry tool scans a stylus across the surface of a sample. The height of the stylus tip above the surface is fixed such that the force acting on the tip remains a constant. A piezoelectric positioner records changes in the relative topography height from point to point and the voltage used to accomplish this is recorded as a function of x y position of the tip, resulting in a detailed representation of relative topography heights across the surface of the dielectric layer.

In the present invention, thickness samples measured by the thickness measurement tool are used in combination with the data gathered by the surface profilometry tool. The information gathered by the tools compliment each other. The thickness measurement tool is adapted to measure the actual thickness of a layer at a point, while the profilometry tool is adapted to measure topography variation across a much wider area, without actually measuring the thickness of the layer at any point. The method and the system of the present invention combines the data generated by the two techniques, the thickness of the layer at a series of sample points and the topography of the layer over the wide area of the die, to accurately determine both the topography and the thickness of the layer with respect to the substrate across the wide area of the die. In so doing, a much more accurate characterization of the topography of the layer with respect to the surface of the underlying substrate is obtained.

It should be appreciated that the thickness measurement tool, although able to determine the thickness of the layer with respect to the underlying substrate at a specific point, is not suited to measuring topography variation of the layer over the area of the die. This is due to several limitations inherent to the design and technique of the thickness measurement tool.

A first limitation is the relative speed of the thickness measurement technique. A finite amount of time is required to mount the device on a separate thickness measurement tool. An additional finite amount of time is required to actually take the samples themselves. Additionally, the measurement area spot size of the measurement area is extremely small in comparison to the total area of the surface of the die. Scanning the surface of the die in its entirety with the measurement area spot size of the thickness measurement tool would consume a large amount of time. Doing so with a significant percentage of dies in the fabrication process would prove unworkable.

A second limitation is the resolution, or actual spot size of the measurement area. Although the spot size is extremely small in comparison to the total area of the surface of the die, the spot size is relatively large in comparison to integrated circuit features of the die. Where a die is fabricated using sub-micron techniques, the relatively large measurement area spot size (20–30 microns) of the thickness measurement tool greatly limits the areas on the surface of the die upon which accurate thickness samples can be measured. This is due to the fact that much of the topography to be measured occurs across areas much smaller than the measurement area spot size of the thickness measurement tool (e.g., less than 10 microns). Thus, the top of the highest "hill" may be within 20–30 microns of the bottom of the lowest "valley."

A third limitation is the fact that the utilization of the thickness measurement tool is relatively cumbersome. The thickness measurement technique requires a finite amount of setup. Using the thickness measurement tool as a separate step in and of itself tends to slow total output of the production line, and thus, tends to limit total through put.

By combining the techniques of the thickness measurement tool and the surface profilometry tool, the above limitations are overcome. The thickness measurement tool characterizes the thickness of the dielectric layer over the known underlying semiconductor substrate at a series of predetermined points having known topography (e.g., input output pads). The predetermined points are also large enough in area such that the measurement area spot size of the thickness measurement tool can take accurate measurements.

The surface profilometry tool and the thickness measurement tool both use pattern recognition techniques to align themselves with the features of the surface of the die. Pattern recognition is used to align the x and y coordinate systems the thickness measurement tool and the surface profilometry tool with known features on the surface of the die. In so doing, surface profilometry measurements can be taken with respect to absolute x and y coordinates. These same absolute x and y coordinates are used in measuring thickness samples, since the thickness measurement tool uses pattern recognition to align to the same known features on the surface of the die. Thus, the present invention can accurately combine the data gathered by the two. The data comprising the thickness samples is used by the profilometry tool in the manner describe above to measure the surface of the dielectric layer with respect to the reference plane, and thus, determine a maximum absolute topography variation of the dielectric layer in relation to the underlying semiconductor substrate.

Figure 4:
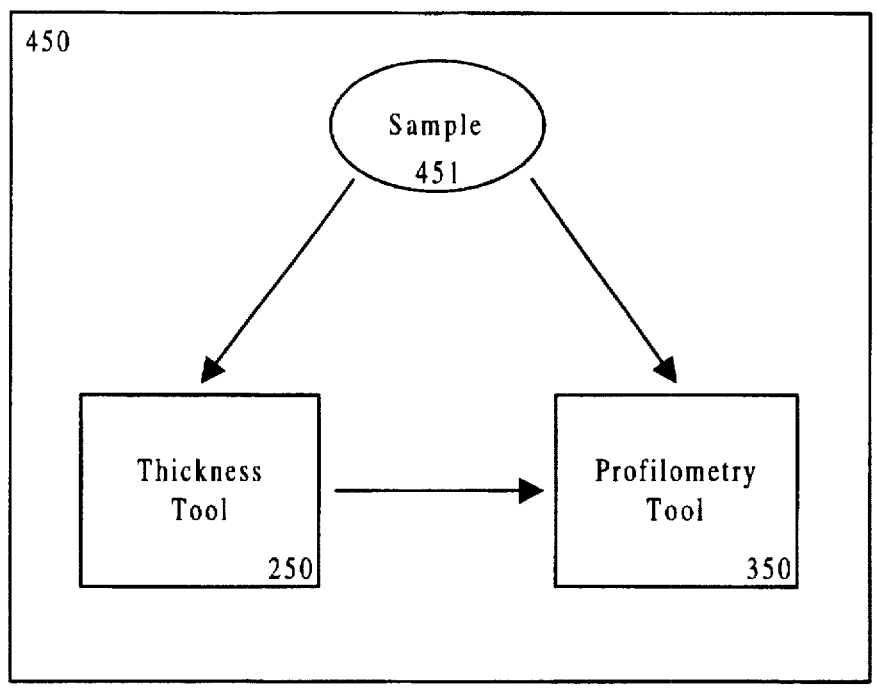
FIG. 4 shows a diagram of the system of the present invention.

Referring now to FIG. 4, a diagram 400 of the present invention is shown. In the present implementation of the invention, a thickness measurement tool 250 and a surface profilometry tool 350 are installed such that the results of the thickness measurement tool 250 can be communicated to the surface profilometry tool 350 on a common platform 450. The thickness measurement tool 250 is coupled to the surface profilometry tool 350 such that the thickness sample data 451 is easily exchanged. The platform 450 accommodates the thickness measurement tool 250 and the surface profilometry tool 350 in a manner facilitating wafer (or die) through put, thereby maximizing a number of devices examined in a given time period.

Figure 5A:
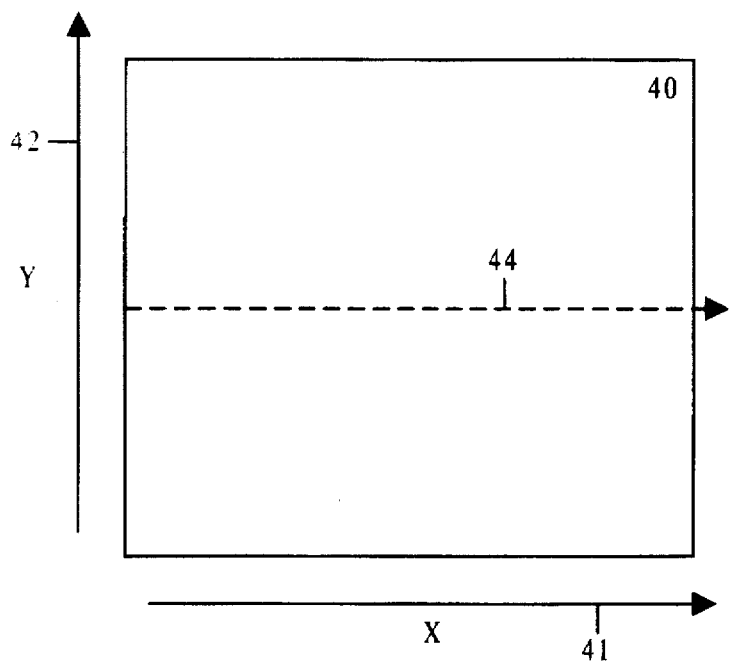
FIG. 5A shows a top down view of an exemplary semiconductor die.
Figure 5B:
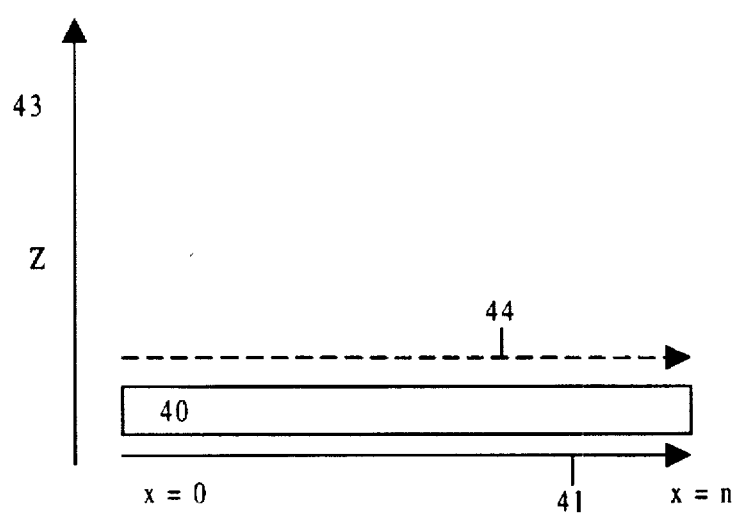
FIG. 5B shows a side view of the exemplary semiconductor die.

FIG. 5A shows a top down view and FIG. 5B shows a side view of an exemplary semiconductor die 40. Each point on the surface of the die 40 has a corresponding set of x, y, and z coordinates. The x and y coordinates represent the longitudinal and latitudinal axis respectively (x axis 41 and y axis 42). The present invention measures a height (z) along a vertical axis (z axis 43) orthogonal to the x axis 41 and y axis 42. The profilometry tool 350 of the present implementation scans across the surface of the die 40, in the x direction, for a given y coordinate. This is represented by scan line 44. For scanned x y coordinates, a corresponding z coordinate is measured. The scanning process represented by line 44 is repeated for each y coordinate of the die 40, resulting in a z coordinate for all points on the surface of die 40. Using this information the present invention determines a maximum relative topography variation, or a maximum relative z variation, of the surface of the die 40.

Figure 6:
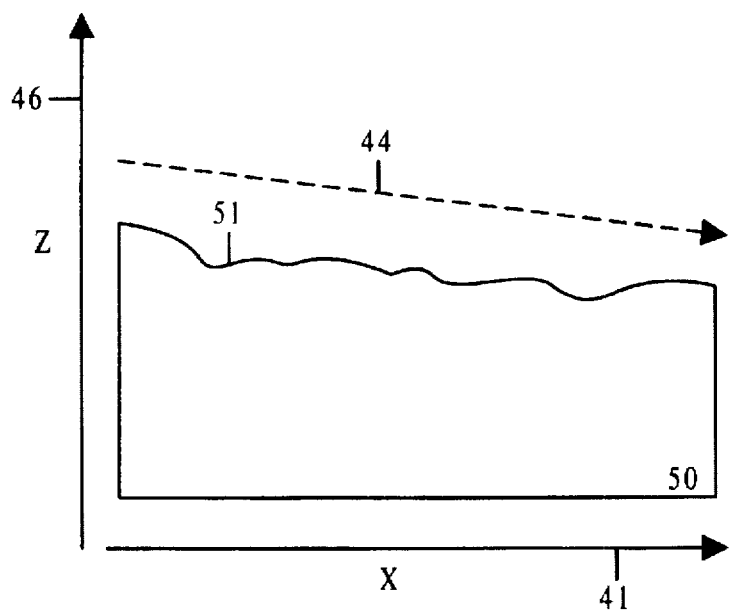
FIG. 6 shows a side view of a die with a "tilted" surface.

FIG. 6 shows a side view of a die 50. The surface 51 of the die 50 is "tilted" with respect to the surface of the substrate (not shown). The amount of tilt shown in the die 50, for illustration purposes is exaggerated (e.g., is not drawn to scale). It should be appreciated, however, that planarization tolerances are very tight (often no more than 0.3 microns absolute topography variation allowable), and therefore, extremely small inaccuracies with regard to mounting a die, equipment calibration, and the like, can lead to a significant amount of tilt. Thus, IC manufacturers measure absolute topography variation with respect to a known layer.

The known layer is usually the surface of the underlying semiconductor substrate (hereafter substrate) of the die. The profilometry tools of the prior art are not able to adequately account for the tilt of the die 50 due to the fact that they are not able to accurately establish an absolute height reference plane from which to measure absolute topography variations of the surface of the die 50. Prior art surface profilometers do not have means to accurately determine the location and orientation of the substrate (not shown). Thus, prior art profilometers measured relative topography variation from an estimated substrate plane, which is less accurate than measuring topography variation from an actual substrate plane.

In one implementation of the present invention, the thickness measurement tool 250 measures the height of the surface of the dielectric layer over the surface of the substrate at given sample points. This enables the present invention to establish the location of the substrate with respect to the surface position of the sample points. If these sample points are taken at locations having known topography (e.g., pads), then an absolute reference plane can be determined based on the sample points. The sample points and their corresponding thickness samples are described in greater detail below.

Figure 7:
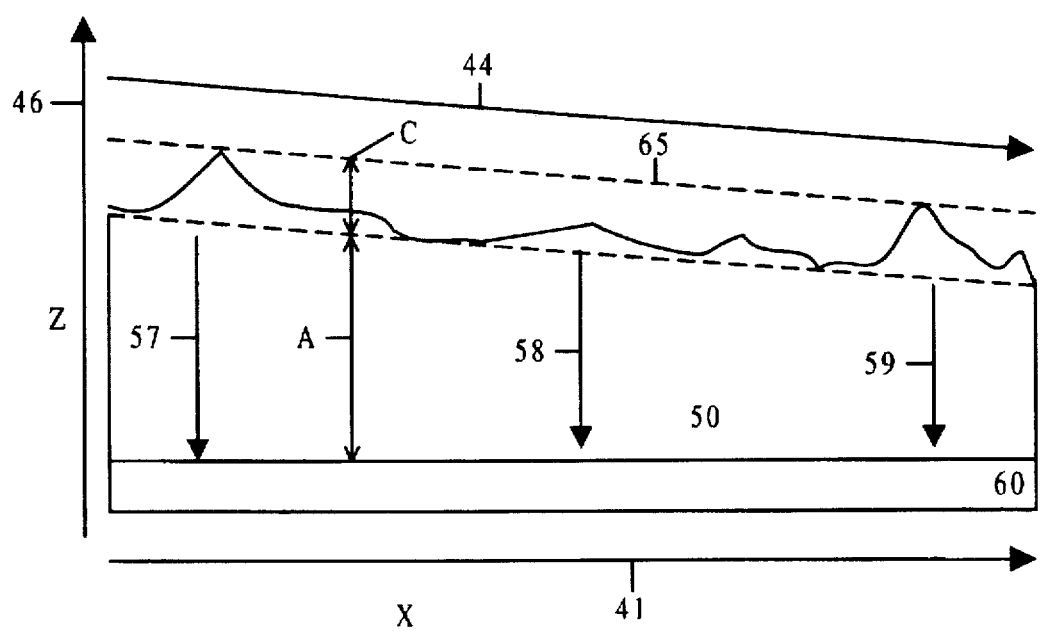
FIG. 7 shows a side view of the die of FIG. 6 with thickness samples.

FIG. 7 shows a side view of the die 50 having thickness samples 57, 58, and 59. The thickness of the dielectric layer is measured at one or more sample points along the scan line 44. Each measurement comprises a thickness sample. The present invention utilizes thickness samples 57, 58, and 59 to determine an absolute height reference plane which corresponds with the actual substrate 60. The present invention does not estimate the location and orientation of the substrate 60, rather, the location and orientation of the substrate 60 is actually determined via the thickness samples 57, 58, and 59. The absolute height values (z values) are measured in a direction parallel to the z axis 46.

Distance C represents the maximum relative topography variation of the surface 65. Distance A represents the height of the surface 65 above the reference plane (corresponding to the plane of the substrate 60). Thus, the absolute height of any point on the surface of the dielectric layer is described by the relationship:

z value (absolute height value)=|A(x,y)|+|C(x,y)|, where z=0 at the absolute height reference plane.

In this manner, the present invention is able to determine die 50 is not planarized within tolerances. Where relative topography variation is not zero, absolute height values are obtained by normalizing relative topography variations for each (x, y) with the absolute height reference plane.

Figure 8:
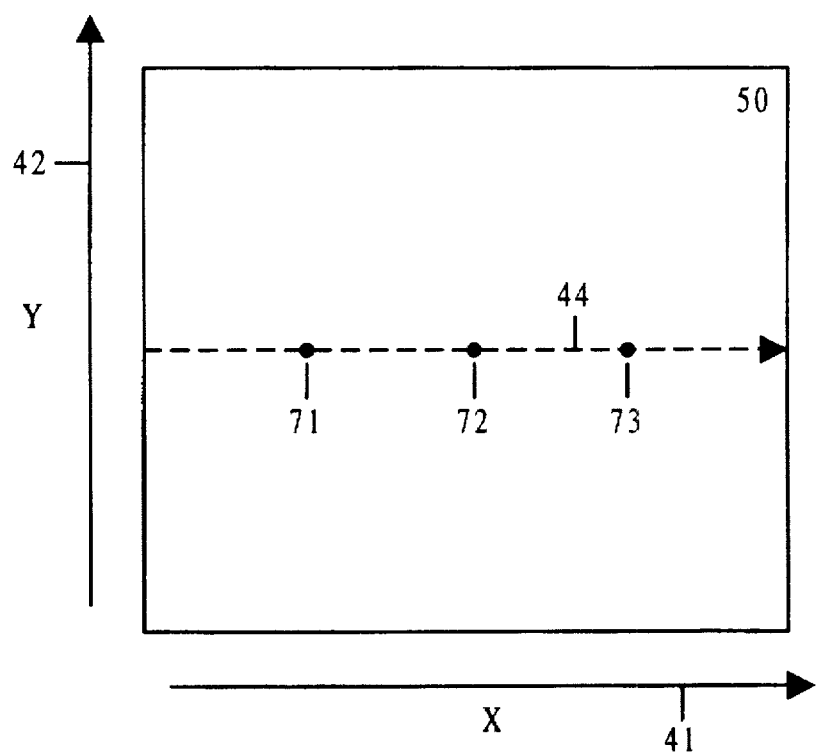
FIG. 8 shows a top down view of the second die having sample points in accordance with the present invention.

Referring now to FIG. 8, a top down view of the die 50 having sample points 71, 72, and 73, is illustrated. Sample points 71, 72 and 73 are located along scan line 44. Thickness samples 57, 58, and 59 thus establish the location and orientation of the substrate 60 along scan line 44. Additional sample points and additional thickness samples can be taken, which will increase the precision of the orientation of the reference plane with respect to the substrate 60. In this manner, the present invention can insure the absolute height reference plane even more closely corresponds to the substrate 60.

Figure 9A:
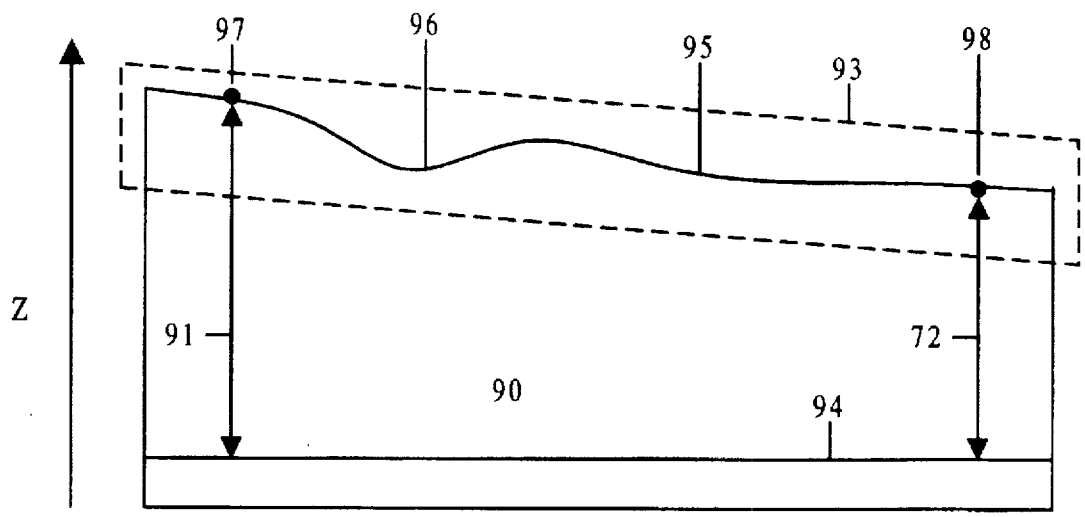
FIG. 9A shows a die having a low point in its surface.
Figure 9B:
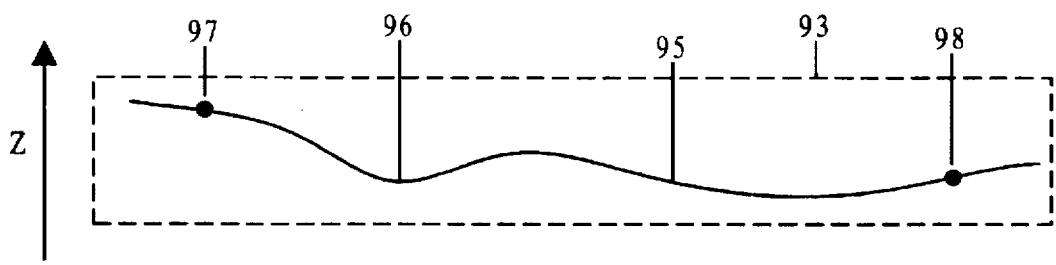
FIG. 9B shows the surface of the die as recorded by the profilometer of the present invention.

Referring now to FIGS. 9A, a side view of a die 90 is shown. The surface 95 of die 90 is tilted with respect to the substrate 94. Thickness samples 91 and 92 are taken at sample points 97 and 98 respectively. Surface 95 has a low point 96. FIG. 9B shows a portion 93 of the die 90. The profilometry tool of the present invention scans along the surface 95 and detects low point 96. The profilometry tool, however, cannot detect the tilt of surface 95 with respect to substrate 94, thus, profilometry data alone records the surface 95 with low point 96 as being "level."

Figure 9C:
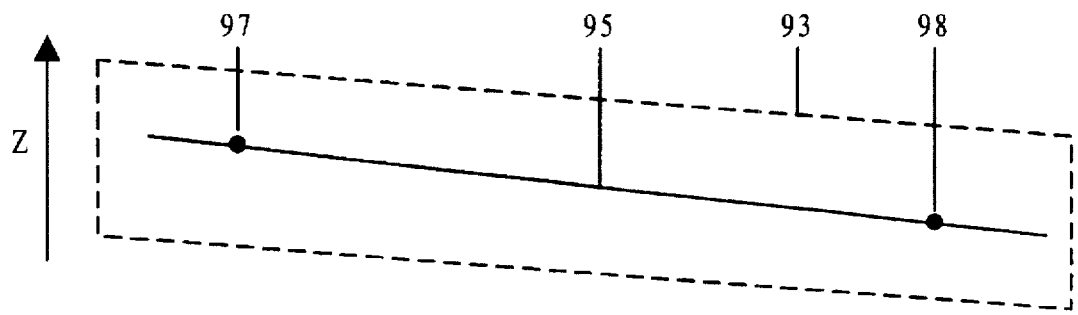
FIG. 9C shows the surface of the die as recorded by the thickness measurement tool of the present invention.
Figure 9D:
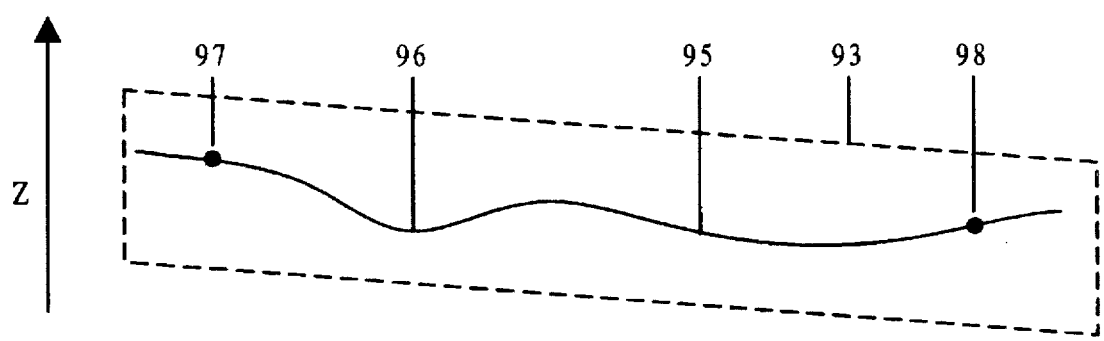
FIG. 9D shows the surface of the die as recorded by the combined data from the profilometer and from the thickness measurement tool of the present invention.

FIG. 9C shows portion 93 as it is recorded by the thickness measurement tool of the present invention. The thickness measurement tool measures thickness samples 91 and 92 at sample points 97 and 98. Thickness samples 97 and 98 reveal the location and orientation of substrate 94. The thickness measurement tool establishes a reference plane corresponding to substrate 94, and thus, records surface 95 as being tilted. The thickness measurement tool, however, cannot detect low point 96 since the thickness measurements are taken only at sample points 97 and 98. FIG. 9D shows the results of combining the data from the profilometry tool and the data from the thickness measurement tool in accordance with the present invention. The profilometry tool detects the presence of low point 96 and the thickness measurement tool detects the tilt of surface 95 with respect to substrate 94. Thus, portion 93 of FIG. 9D correctly reflects the low point 96 and the tilt of the surface 95, as shown.

Figure 10:
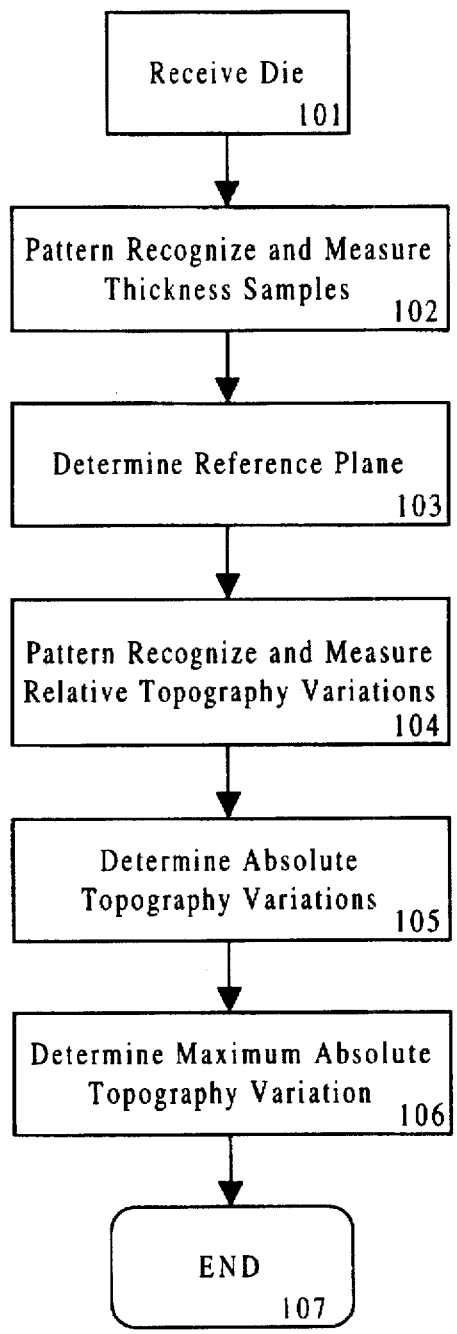
FIG. 10 is a flow chart of the steps of one implementation of the present invention.

Referring now to FIG. 10, a flow chart of the method 100 of one implementation of the present invention is shown. In step 101, the present implementation receives a die for measurement. The die is securely mounted on a measuring platform 450 and the x, y, and z axis of the present invention are aligned in relation to the die. In step 102, a thickness measurement tool 250 of the present invention uses pattern recognition to align absolute coordinates with the features of the surface of the die and measures thickness samples at a series of predetermined points using the absolute coordinates. The thickness samples characterize the thickness of a dielectric layer over an underlying known height position silicon substrate. From the thickness samples and the known position of the substrate, the absolute height of the sample points are known. In step 103, the present invention determines an absolute height reference plane using the data contained in the determined absolute height of the samples.

In step 104, a profilometry tool 350 of the present invention uses pattern recognition to align absolute coordinates with the features on the surface of the die and measures relative topography variations of the surface of the dielectric layer over the underlying silicon substrate and the profilometry tool 350. The measurements are taken with respect to the absolute coordinates. In step 105, the present invention adjusts the relative topography variations measured according to the absolute height reference plane determined, resulting in absolute topography variations. In step 106, the present invention uses the absolute topography variations to determine a maximum absolute topography variation comprising the height difference (z difference) between the highest point on the surface of the dielectric layer in relation to the underlying substrate and the lowest point. The method 100 of the present invention ends in step 107 and begins again when another die is received in step 101.

Thus, the sample assisted profilometry system of the present invention provides a system for accurately measuring the absolute topography variation of a surface of a layer with respect to the surface of a known underlying layer. The sample assisted profilometry system of the present invention provides a system for accurately measuring the absolute topography variation of the surface of a dielectric layer with respect to the surface of an underlying semiconductor substrate. The absolute topography variation is measured in relation to a reference plane corresponding to the surface of the underlying semiconductor substrate.

The present invention, a method and system for sample assisted profilometry, is thus described. While the present invention has been described in particular embodiments, it should be appreciated that the present invention should not be construed as limited by such embodiments, but rather construed according to the below claims.

What is claimed is:

1. A film thickness sample assisted surface profilometry system for determining an absolute topography variation of a surface of a layer, comprising:

a thickness measurement tool for measuring a thickness of the layer, by measuring a thickness sample, wherein the thickness sample characterizes the thickness of the layer with respect to a known layer of known height orientation; and a surface profilometry tool coupled to receive the measured thickness sample from the thickness measurement tool, the surface profilometry tool for measuring relative topography variations of the surface of the layer, the surface profilometry tool using the thickness sample to determine an absolute height reference plane with respect to the known layer, the surface profilometry tool for determining a maximum absolute topography variation of the surface of the layer based on said relative topography variations and said absolute height reference plane.

2. The sample assisted surface profilometry system of claim 1 wherein the thickness measurement tool is an optical thin film thickness measurement tool.

3. The sample assisted surface profilometry system of claim 1 wherein the surface profilometry tool is an atomic force microscope tool.

4. The sample assisted surface profilometry system of claim 1 wherein the thickness sample is measured at a location on the surface of the layer which is over a pad on the known layer.

5. The sample assisted surface profilometry system of claim 1 wherein the known layer is the surface of an underlying semiconductor substrate.

6. The sample assisted surface profilometry system of claim 1 wherein the layer is a dielectric material deposited over the known layer.

7. A sample assisted surface profilometry system, comprising:

a platform;

a thickness measurement tool mounted on the platform, the thickness measuring tool measuring the thickness of a layer over a known layer of a die at a plurality of sample points to produce absolute height coordinates for said plurality of sample points, the known layer having a known height orientation; and a surface profilometry tool mounted on the platform and coupled to receive the absolute height coordinates of the plurality of sample points from the thickness measurement tool, the surface profilometry tool for measuring relative topography variations of the surface of the layer over the known layer, the surface profilometry tool for determining a maximum absolute topography variation of the surface of the layer over the known layer based on the relative topography variations and the absolute height coordinates of the plurality of sample points.

8. The sample assisted surface profilometry system of claim 7 wherein the thickness measurement tool is an optical thin film thickness measurement tool.

9. The sample assisted surface profilometry system of claim 7 wherein the surface profilometry tool is an atomic force microscope tool.

10. The sample assisted surface profilometry system of claim 7 wherein the known layer is the surface of an underlying semiconductor substrate.

11. The sample assisted surface profilometry system of claim 7 wherein the layer is a dielectric material deposited over the known layer.

12. A method for characterizing a surface of an integrated circuit layer comprising the steps of:
   a) measuring thicknesses of a first plurality of points across said surface of said integrated circuit layer with reference to layer of known height orientation, said step a) performed using a thin film thickness measurement tool;
   b) determining absolute height coordinates for said first plurality of sample points based on respective measured thicknesses;
   c) communicating said absolute height coordinates of said first plurality of sample points from said thin film thickness measurement tool to a surface profilometry measurement tool;
   d) measuring relative heights of a second plurality of sample points across said integrated circuit layer wherein said first plurality of sample points are included within said second plurality of sample points, said step d) performed using said surface profilometry measurement tool;
   e) based on said relative heights measured by step d), and based on said absolute height coordinates for said first plurality of sample points, determining absolute heights of said second plurality of sample points; and
   f) determining maximum absolute topography variation of said integrated circuit layer based on said absolute heights of said second plurality of sample points.

13. A method as described in claim 12 wherein said step e) comprises the steps of:
   e1) determining an absolute reference plane of said integrated circuit layer based on said absolute height coordinates of said first plurality of sample points; and
   e2) determining, for each sample point of said second plurality of sample points, an absolute height measurement by normalizing a respective relative height measurement of each sample point with said determined absolute reference plane of said integrated circuit layer.

14. A method as described in claim 12 wherein said thin film measurement tool is an optical thin film measurement tool.

15. A method as described in claim 12 wherein said thin film measurement tool is an infrared thin film measurement tool.

16. A method as described in claim 12 wherein said surface profilometry measurement tool is an atomic force microscopy tool.

* * * * *